United States Patent
Qin

(10) Patent No.: US 10,964,072 B2
(45) Date of Patent: Mar. 30, 2021

(54) METHODS, SYSTEMS, AND MEDIA FOR NOISE REDUCTION IN COMPUTED TOMOGRAPHY IMAGES

(71) Applicant: CHONGQING UNIVERSITY OF POSTS AND TELECOMMUNICATIONS, Chongqing (CN)

(72) Inventor: Hongxing Qin, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 333 days.

(21) Appl. No.: 15/752,697

(22) PCT Filed: Mar. 16, 2016

(86) PCT No.: PCT/CN2016/076527
§ 371 (c)(1),
(2) Date: Feb. 14, 2018

(87) PCT Pub. No.: WO2017/031982
PCT Pub. Date: Mar. 2, 2017

(65) Prior Publication Data
US 2018/0247434 A1  Aug. 30, 2018

(30) Foreign Application Priority Data
Aug. 24, 2015 (CN) .......................... 201510522131.0

(51) Int. Cl.
*G06T 11/00* (2006.01)
(52) U.S. Cl.
CPC .......... *G06T 11/005* (2013.01); *G06T 11/003* (2013.01); *G06T 11/006* (2013.01); *G06T 2210/41* (2013.01)

(58) Field of Classification Search
None
See application file for complete search history.

(56) References Cited

U.S. PATENT DOCUMENTS

| 6,721,387 B1 | 4/2004 | Naidu et al. |
| 9,339,243 B2* | 5/2016 | Zhang ............. A61B 6/025 |
| 10,388,036 B2* | 8/2019 | Chen ............. G06T 11/006 |
| 2009/0074278 A1* | 3/2009 | Beaulieu ........... G06T 5/10 382/131 |

(Continued)

FOREIGN PATENT DOCUMENTS

| CN | 103020928 A | 4/2013 |
| CN | 103310432 A | 9/2013 |

(Continued)

OTHER PUBLICATIONS

Peters, Terry. "CT image reconstruction." SLIDES REVL (2002): 05697-05745, https://www.aapm.org/meetings/02AM/pdf/8372-23331.pdf (Year: 2002).*

(Continued)

*Primary Examiner* — Tahmina N Ansari
(74) *Attorney, Agent, or Firm* — Metis IP LLC

(57) ABSTRACT

Implementations of the disclosure provide for methods, systems, and media for image reconstruction using metal artifacts reductions techniques. In some embodiments, a method for image reconstruction is provided, the method comprising: receiving a first computed tomography (CT) image and a second CT image; generating, by a processing device, a prior image based on the second CT image; generating a noise image based on the first CT image, wherein the noise image corresponds to metal artifacts in the first CT image; and reconstructing, by the processing device, the first CT image based at least in part on the prior image. In some embodiments, generating the prior image comprises: registering the first CT image and the second CT image to generate a registered image; and reducing noise artifacts in the registered image.

16 Claims, 9 Drawing Sheets

(56) References Cited

U.S. PATENT DOCUMENTS

| | | | | |
|---|---|---|---|---|
| 2011/0280458 | A1* | 11/2011 | Flohr | G06T 5/002 |
| | | | | 382/131 |
| 2014/0233692 | A1* | 8/2014 | Case | G06F 3/04842 |
| | | | | 378/5 |
| 2016/0371863 | A1* | 12/2016 | Simon | G06T 11/006 |
| 2017/0156690 | A1* | 6/2017 | Yi | A61B 6/037 |
| 2018/0025510 | A1* | 1/2018 | Chen | A61B 6/583 |
| | | | | 382/131 |
| 2018/0247434 | A1* | 8/2018 | Qin | G06T 11/006 |
| 2019/0012805 | A1* | 1/2019 | Bertram | G06T 7/174 |
| 2019/0073802 | A1* | 3/2019 | Case | A61B 6/5205 |
| 2019/0325621 | A1* | 10/2019 | Wang | A61B 6/037 |

FOREIGN PATENT DOCUMENTS

| | | |
|---|---|---|
| CN | 103440636 A | 12/2013 |
| CN | 103617598 A | 3/2014 |
| CN | 103810734 A | 5/2014 |
| CN | 104751429 A | 7/2015 |
| WO | 2017031982 A1 | 3/2017 |

OTHER PUBLICATIONS

International Search Report in PCT/CN2016/076527 dated Jun. 20, 2016, 4 pages.

Written Opinion in PCT/CN2016/076527 dated Jun. 20, 2016, 4 pages.

Moti Raj Paudel et al., Clinical evaluation of normalized metal artifat reduction in kvct using mvct prior image (MVCT-NMAR) for radiation therapy treatment planning. International Journal of Radiation Oncology Biology Physics, 89:682-689, 2014.

First Office Action in Chinese Application No. 201510522131.0 dated May 3, 2017, 9 pages.

* cited by examiner

METHODS, SYSTEMS, AND MEDIA FOR NOISE REDUCTION IN COMPUTED TOMOGRAPHY IMAGES

CROSS-REFERENCE TO RELATED APPLICATION

This application is a U.S. national stage of International Application No. PCT/CN2016/076527, filed on Mar. 16, 2016, which claims the benefit of Chinese Patent Application No. 201510522131.0, filed Aug. 24, 2015, which is hereby incorporated by reference in its entirety.

TECHNICAL FIELD

The present disclosure generally relates to image reconstruction and, more particularly, relates to a system and method for reconstructing computed tomography (CT) images by performing noise reduction.

BACKGROUND

Computed tomography (CT) technology has been widely used in various diagnostic and therapeutic applications over past two decades. It has played an increasingly important role in helping physicians make accurate diagnoses and adaptive therapeutic schedules for different patients.

However, images generated using existing CT technologies may include severe shading and streaking caused by metallic implants in the body of patients (also referred to as "metal artifacts"). Presence of these metal artifacts in the CT images may provide incorrect electron density information and can obscure crucial diagnostic information. For example, the presence of dental fillings may make intraoral and intracranial tumors not clearly recognizable in a CT image. In addition, the presence of the metal artifacts may lead to serious deviations between the radiation dose calculated based on the CT image and the actual radiation dose required in the radiation therapy.

Accordingly, new mechanisms for reducing metal artifacts in CT images are desirable.

SUMMARY

Implementations of the disclosure provide for methods, systems, and media for image reconstruction using metal artifacts reductions techniques. In some embodiments, a method for image reconstruction is provided, the method may include: receiving a first computed tomography (CT) image and a second CT image; generating, by a processing device, a prior image based on the second CT image; generating a noise image based on the first CT image, wherein the noise image corresponds to metal artifacts in the first CT image; and reconstructing, by the processing device, the first CT image based at least in part on the prior image.

In some embodiments, the first CT image is a kilovoltage computed tomography (KVCT) image. The second CT image is a megavoltage computed tomography (MVCT) image.

In some embodiments, generating the prior image may include: registering the first CT image and the second CT image to generate a registered image; and reducing noise artifacts in the registered image.

In some embodiments, registering the first CT image and the second CT image may include making pixels of the first image match with pixels of the second image.

In some embodiments, reducing the noise artifacts in the registered image may include performing a normalized metal artifact reduction (NMAR) algorithm.

In some embodiments, generating the noise image may include performing image segmentation on the first image.

In some embodiments, the noise image is a metal image.

In some embodiments, reconstructing the first CT image may include: generating a first sinogram of the prior image, a second sinogram of the noise image, and a third sinogram of the first CT image; generating a corrected sinogram of the first image based at least in part on the first sinogram, the second sinogram, and the third sinogram; and reconstructing the first image based on the corrected sinogram.

In some embodiments, generating the second sinogram and the third sinogram may include performing forward projection.

In some embodiments, the methods may include constructing an optimization model based on the first sinogram, wherein the corrected sinogram of the first image is generated based on the optimization model.

In some embodiments, the optimization model may include a variational model via $L_1$ sparse regularization in a gradient domain.

In some embodiments, reconstructing the first CT image may include performing backward projection on the corrected sinogram.

In some embodiments, a system for image reconstruction is provided. The system may include at least one processing device to: receive a first computed tomography (CT) image and a second CT image; generate a prior image based on the second CT image; generate a noise image based on the first CT image, and the noise image corresponds to metal artifacts in the first CT image; and reconstruct the first CT image based at least in part on the prior image.

In some embodiments, a non-transitory machine-readable storage medium including instructions accessed by a processing device is provided. The non-transitory machine-readable storage medium may cause the processing device to: receive a first computed tomography (CT) image and a second CT image; generate a prior image based on the second CT image; generate a noise image based on the first CT image, wherein the noise image corresponds to metal artifacts in the first CT image; and reconstruct the first CT image based at least in part on the prior image.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
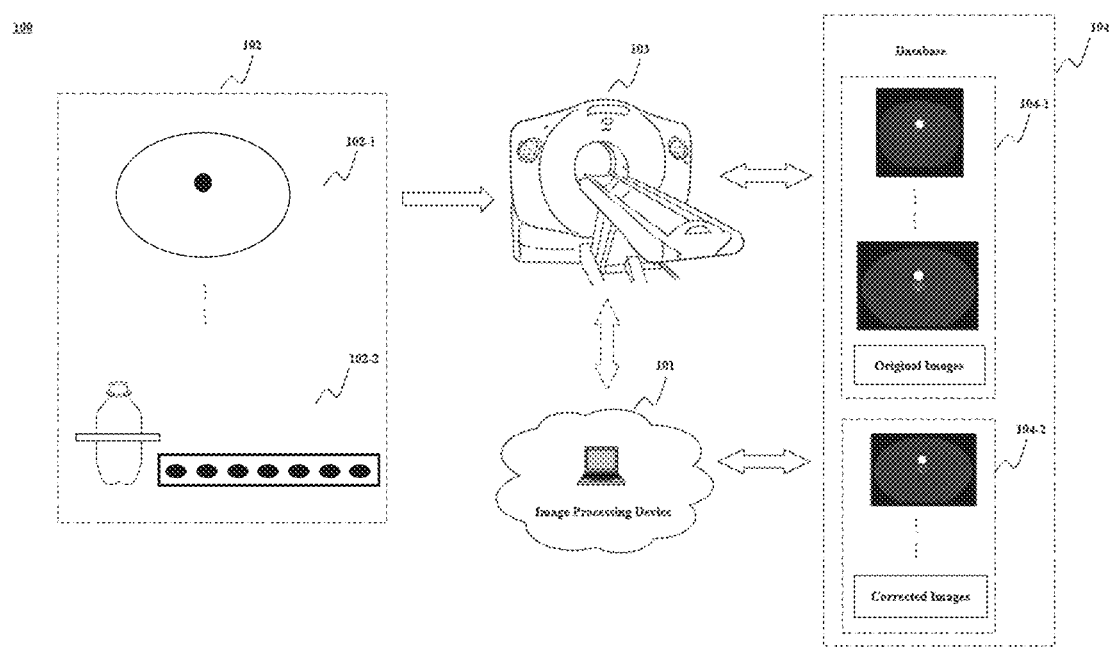
FIG. 1 is a block diagram of a system for image reconstruction according to some embodiments of the present disclosure.

The present disclosure provided herein relates to image reconstruction. More particularly, aspects of the present disclosure provide for systems, methods, and media for reconstructing computed tomography (CT) images by reducing metal artifacts in the CT images. As referred to herein, metal artifacts in an image may include and/or be any noise and/or artifact in the image that is produced by the presence of one or more metallic objects. Metal artifacts may be caused by, for example, beam hardening phenomenon, photon starvation, attenuation artifacts, etc.

Existing mechanisms for image construction and metal artifact reduction (MAR) for CT images fail to provide solutions for accurate and efficient MAR. For example, new artifacts and/or errors may be introduced when performing MAR using the existing mechanisms. As another example, the existing mechanisms cannot correctly reconstruct CT images with severe metallic artifacts.

Aspects of the present disclosure address the above deficiencies by providing mechanisms (e.g., systems, methods, machine-readable media, etc.) for image reconstruction and MAR. The mechanisms can reconstruct CT images, such as kilovoltage computed tomography (KVCT) images, megavoltage computed tomography (MVCT) images, megavoltage cone beam computed tomography (MVCBCT) images, etc. For example, the mechanisms can reconstruct a KVCT image based on a prior image generated based on a MVCT image (e.g., a MVCBCT image). More particularly, for example, the mechanisms can register the KVCT image and the MVCT image to generate the prior image. The prior image may also be generated by reducing metal artifacts in the MVCT image. Sinogram data may then be generated for the prior image (e.g., using a normalized metal artifact reduction method). As referred to herein, sinogram data of an image may be a visual representation of the original image in a computed axial tomography scan. In some embodiments, sinogram data of an image may be obtained by performing a Radon transform on the image (e.g., a forward projection). The image may be reconstructed based on the sinogram (e.g., using a backward projection method).

The mechanisms can also construct an optimization model based on sinograms of the prior image, the KVCT image, and/or any other data. In some embodiments, the optimization model may be a variational model via $L_1$ sparse regularization in the gradient domain. The optimization model may be used to interpolate one or more metal projections and/or to denoise other projections in the KVCT image. In some embodiments, corrected sinogram data (e.g., a corrected sinogram of the KVCT image) may be generated based on the optimization model. A corrected image (e.g., a reconstructed image) of the KVCT image may be generated based on the corrected sinogram data. As referred to herein, a projection of an object may be obtained via applying a tomographic measurement process to the object at a given angle. The projection may be made up of a set of line integrals through the object. A sinogram represent relationship between multiple projections and the angles they were acquired.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an" and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure.

FIG. 1 illustrates an example 100 of a system for image reconstruction according to some embodiments of the present disclosure. As shown, system 100 may include an image processing device 101, a CT scanning device 103, a database 104, and/or any other component for performing image reconstruction.

The image processing device 101 may be configured to receive, process, transmit, etc. information received from various modules or units of system 100 or any other device. The information may include programs, software, algorithms, data, text, number, images, voice, or the like, or any combination thereof. In some embodiments, the image processing device 101 may receive images from the CT scanning device 103 and can process the images to generate one or more corrected image 104-2. In some embodiments, the image processing device 101 may preprocess and optimize the image data stored in itself. As another example, some information may be imported into the image processing device 101 from external resource, such as a floppy disk, a hard disk, a wireless terminal, or the like, or any combination thereof. Image preprocessing and optimizing may be based on an algorithm including, for example, the split Bregman algorithm, Fourier slice theorem, filtered back projection algorithm, fan-beam reconstruction, iterative reconstruction, or the like, or any combination thereof. The corrected images 104-2 preprocessed and optimized by the image processing device 101 may have less noise artifacts than the original images 104. For better understanding the present disclosure, the image processing device 101 is described as an example of an information processing device. The above description of the image processing device 101 is merely for exemplary purposes, should not be understood as the only embodiments, and these examples do not limit the scope of the present disclosure.

The image processing device 101 may be communicatively coupled to the CT scanning device 103 and/or any other component of system 100. The connection between different devices may be wired or wireless. The wired connection may include using a metal cable, an optical cable, a hybrid cable, an interface, or the like, or any combination thereof. The wireless connection may include using a Local Area Network (LAN), a Wide Area Network (WAN), a Bluetooth, a Zig Bee, a Near Field Communication (NFC), the like, or any combination thereof. In some embodiments, these units may be independent, and in some embodiments, part of the devices may be integrated into one device to work together.

In some embodiments, the image processing device 101 can perform one or more operations described in connection with FIGS. 5-8B.

The CT scanning device 103 may be and/or include any suitable tomographic imaging device. For example, the CT scanning device 103 may include a radiation imaging system, a computed tomography (CT) system, a digital radiography (DR) system, a multi-modality system, the like, or any combination thereof. Examples of a multi-modality system may include a computed tomography-magnetic resonance imaging (CT-MRI) system, a computed tomography-positron emission tomography (CT-PET) system, etc. The radiation used herein may include a particle ray, a photon ray, or the like, or any combination thereof. The particle ray may include neutron, proton, electron, p-meson, heavy ion, or the like, or any combination thereof. The photon beam may include X-ray, γ-ray, α-ray, β-ray, ultrasonic, ultraviolet, laser, the like, or any combination thereof.

In some embodiments, the CT scanning device 103 can scan an object 102 and generate CT images 104-1 (also referred to as the original images). The object 102 may include a body, a tissue, an organ, a specimen, a substance, the like, or any combination thereof. In some embodiments, the object may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. In some embodiments, the object 102 may include a single metal insert 102-1 and bilateral metal insert 102-2, etc. A CT image of the object 102 may include noise and/or artifacts caused by outside implants, inside implants, the like, or any combination thereof. The material of the implant may include metal, ceramic, plastic, and/or any other material that may introduce noise and/or artifacts in a CT image. The metal material may include gold, silver, copper, iron, manganese, zinc, the like, or any combination thereof.

The CT images can be generated using any suitable tomographic imaging technique. In some embodiments, a user may input one or more parameters or conditions to initiate a scan. Exemplary parameters or conditions may include a scanning time, a scanning voltage, a location of the object for scanning, the rotating speed of the gantry, the like, or any combination thereof. The CT scanning device 103 can generate CT images using various scanning voltages. For example, the scanning voltage used to generate one or more CT images may fall within a range (e.g., a range between 80 KV and 140 KV, a range between 8 MV and 14 MV, etc.). Different CT images may be obtained under different scanning voltages. For example, kilovoltage computed tomography (KVCT) images may be generated using a kilovoltage CT scanner. As another example, megavoltage computed tomography (MVCT) images may be generated using a megavoltage CT scanner. The original CT images 104 may be and/or include one or more KVCT images, megavoltage computed tomography MVCT images, etc.

The data storage 104 may be configured or used to store information. The information may include programs, software, algorithms, data, text, number, images, voice, or the like, or any combination thereof. The data storage 104 may receive the information from image processing device 101, a CT scanning device 103, and/or other modules or units that may generate information. In some embodiments, the data storage 104 may store the original CT images 104-1, the corrected images 104-2, data about optimization modules, sinogram data of images, and/or any other data provided by one or more components of system 100.

The data storage 104 may be communicatively coupled to image processing device 101, the CT scanning device 103, and/or any other component of system 100 via one or more communication links. Such a communication link may be wired or wireless. A wired communication link may include using a metal cable, an optical cable, a hybrid cable, an interface, or the like, or any combination thereof. A wireless communication link may include using a Local Area Network (LAN), a Wide Area Network (WAN), a Bluetooth, a Zig Bee, a Near Field Communication (NFC), or the like, or any combination thereof.

In some embodiments, each of the image processing device 101, the imaging system 103, and the database 104 may include and/or be any of a general purpose device such as a computer or a special purpose device such as a client, a server, and/or any other suitable device. Any of these general or special purpose devices may include any suitable components such as a hardware processor (which may be a microprocessor, digital signal processor, a controller, and/or any other suitable hardware processor, memory, communication interfaces, display controllers, input devices, and/or any other suitable components). For example, each of the image processing device 101, the imaging system 100, and the database 104 may be implemented as or include a personal computer, a tablet computer, a wearable computer, a multimedia terminal, a mobile telephone, a gaming device, a set-top box, a television, and/or any other suitable device. Moreover, each of the image processing device 101, the imaging system 100, and the database 104 may include a storage device, which may include a hard drive, a solid state storage device, a removable storage device, and/or any other suitable storage device. Each of the image processing device 101, the imaging system 100, and the database 104 may be located at any suitable location. Each of the image processing device 101, the imaging system 100, and the database 104 may be implemented as a stand-alone device or integrated with other components of system 100. The system 100 can find its applications in medical imaging systems, industrial detection systems, security screening systems, and/or any other system that may utilize the image reconstruction techniques disclosed herein.

It should be noted that the above description about system 100 is merely an example, should not be understood as the only embodiment. Obviously, to those skilled in the art, after understanding the basic principles of the connection between different devices, the devices and connection between the devices may be modified or varied without departing from the principles. The modifications and variations are still within the scope of the current disclosure described above. For example, the assembly and/or function of system 100 may be varied or changed according to specific implementation scenarios. Merely by way of example, some other components may be added into system 100, such as a patient positioning unit, a storage unit, a high-voltage tank, an amplifier unit, an analog-to-digital converter, a digital-to-analog converter, an interface circuit, or the like, or any combination thereof. However, those variations and modifications do not depart from the scope of the present disclosure.

Figure 2:
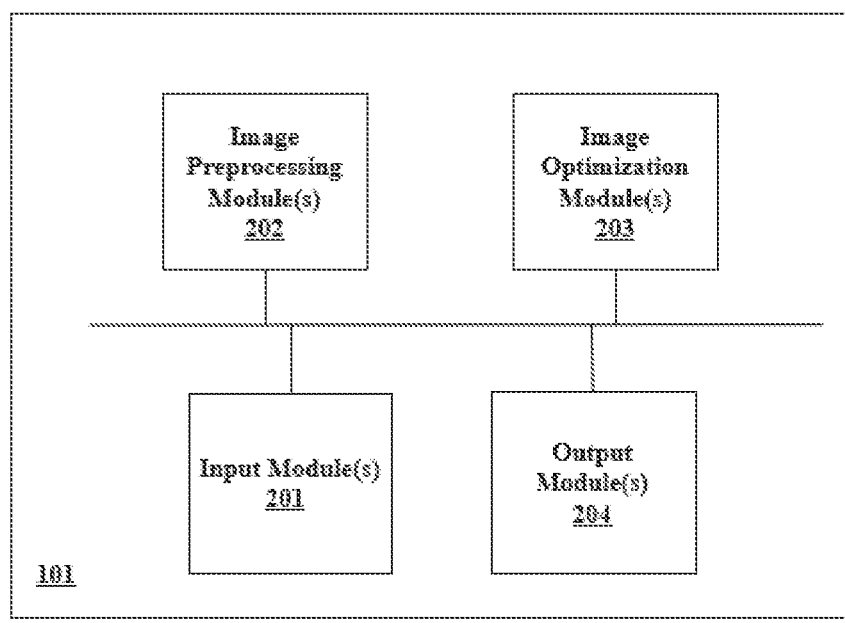
FIG. 2 is a block diagram illustrating an example of an image processing device according to some embodiments of the present disclosure.

FIG. 2 is a block diagram of an image processing device 101 according to some embodiments of the present disclosure. More or less components may be included in image processing device 101 without loss of generality. For example, two of the modules may be combined into a single module, or one of the modules may be divided into two or more modules. In one implementation, one or more of the modules may reside on different computing devices (e.g., desktops, laptops, mobile phones, tablet computers, wearable computing devices, etc.). In some embodiments, the image preprocessing device of FIG. 2 may be and/or include the image processing device 101 as described in connection with FIG. 1 above.

As shown, the image processing device 101 may include one or more input module(s) 201, image preprocessing module(s) 202, image optimization module(s) 203, and output module(s) 204. The input module 201 may be configured to receive and deliver information from the CT scanning device 103 of FIG. 1. The information may include programs, software, algorithms, data, text, number, images, voice, or the like, or any combination thereof. In some embodiments of the present disclosure, the input module 201 may be configured to receive and deliver one or more images. Exemplary images may include composite images, sub-images of a region of interest through a series of scans of a region of interest, overlapping images of the sub-images, or the like, or a combination thereof. The information received by the input module 201 may be sent to the image preprocessing module 202, the image optimization module 203, and/or the output module 204.

The input module 201, the image preprocessing module 202, the image optimization module 203, and the output module 204 may be communicatively coupled to each other via any suitable communication connection, such as one or more wired or wireless connections. Examples of a wired connection may include a metal cable, an optical cable, a hybrid cable, an interface, the like, or any combination thereof. Examples of a wireless connection may include a Local Area Network (LAN), a Wide Area Network (WAN), a Bluetooth connection, a Zig Bee, a Near Field Communication (NFC), the like, or any combination thereof. In some embodiments, the image preprocessing module 202, the image optimization module 203, and the output module 204 may be coupled to each other directly, or with an intermediate unit (not shown in FIG. 1). The intermediate unit may be a visible component or an invisible field (radio, optical, sonic, electromagnetic induction, etc.).

The image preprocessing module 202 may be configured to process images received from the input module 201, the CT scanning device 103, and/or any other device that can provide images. For example, the image preprocessing module 202 can perform image registration, image segmentation, noise and/or artifact reduction, and/or any other function on images. In some embodiments, the image preprocessing module 202 can include one or more units described in connection with FIG. 3 below. The image preprocessing module 202 may generate one or more preprocessed images and may provide the preprocessed images to the image optimization module 203, the output module 204, and/or any other device. The image preprocessing module 202 can perform one or more operations described in connection with FIG. 6 in some embodiments.

The image optimization module 203 may be configured to optimize images received from the image preprocessing module 202, the CT scanning device 103, and/or other device. The optimization may be performed based on algorithm including, for example, the split Bregman algorithm, Fourier slice theorem, filtered back projection algorithm, fan-beam reconstruction, iterative reconstruction, etc. The image optimization module 203 reduce the noise of images generated by the image preprocessing module 202. Exemplary algorithms of noise reduction may include Chroma and luminance noise separation, anisotropic diffusion, wavelet transform, a non-local means, a nonlinear filter, a statistical algorithm, a linear smoothing filter, or the like, or any combination thereof. In some embodiments, an optimization model may be constructed to perform noise and/or artifact reduction on one or more preprocessed images generated by the image optimization module 203. As will be discussed in more detail in connection with FIG. 4 below, corrected sinogram data and/or reconstructed CT images may be generated based on the optimization model. The image optimization module 203 may include one or more models and/or units described in connection with FIG. 4 below. The image optimization module 203 can perform one or more operations described in connection with FIG. 7 in some embodiments.

The output module 204 may be configured to output data provided by the input module 201, the image preprocessing module 202, the image optimization module 203, the CT scanning device 103, and/or any other component of system 100. In some embodiments, the output module 204 may output the corrected images generated by the image optimization module 203. In some embodiments, the output module 204 may output information received from an external resource, such as a floppy disk, a hard disk, a wireless terminal, or the like, or any combination thereof. And according to some embodiments of the present disclosure, the user or the operator may select one or more images from the output module 204 to use according to some conditions. It should be noted that the above description about the output module 204 is merely an example according to some embodiments of the present disclosure.

It should be noted that the above description of the image processing device 101 is provided for the purposes of illustration, not intended to limit the scope of the present disclosure. For persons having ordinary skills in the art, various variations and modifications may be conducted under the teaching of the present disclosure. For example, the input module 201 and an output module 204 may be configured or used to store information. For another example, the image preprocessing module 202 and the image optimization module 203 may be merged as a single module that reduce the noise and artifact of images. However, those variations and modifications may not depart the protecting scope of the present disclosure.

Figure 3:
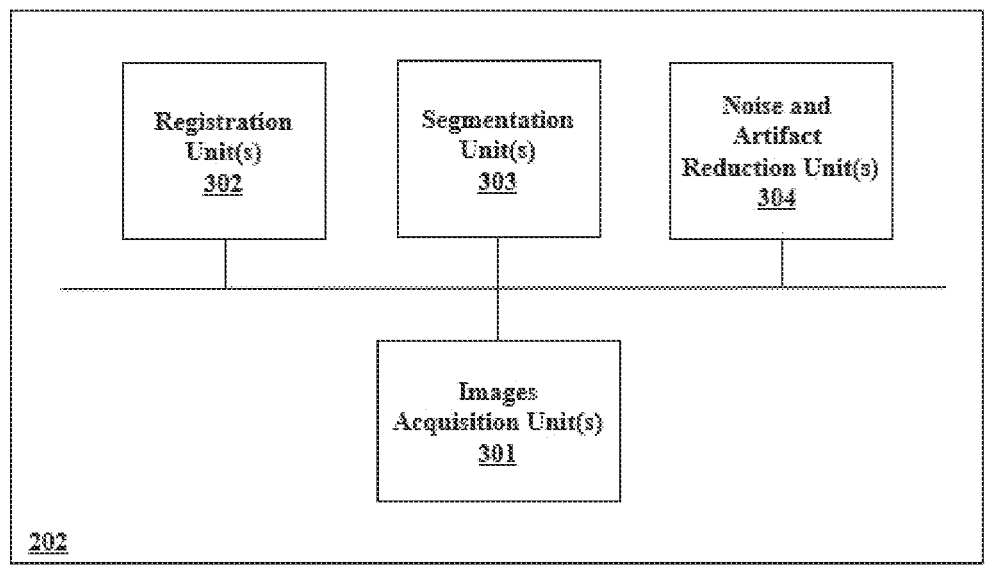
FIG. 3 is a block diagram illustrating an example of an image preprocessing module according to some embodiments of the present disclosure.

FIG. 3 is a block diagram illustrating an example of an image preprocessing module 202 according to some embodiments of the present disclosure. More or less components may be included in image preprocessing module 202 without loss of generality. For example, two of the units may be combined into a single units, or one of the units may be divided into two or more units. In one implementation, one or more of the units may reside on different computing devices (e.g., desktops, laptops, mobile phones, tablet computers, wearable computing devices, etc.).

As shown, the image preprocessing module may include one or more image acquisition unit(s) 301, registration unit(s) 302, segmentation unit(s) 303, noise and artifact reduction unit(s) 304, and/or any other component for processing images in accordance with the present disclosure.

The image acquisition unit 301 may be configured to capture, receive, store, transmit, and/or perform any other function on image data (e.g., one or more images, video data, etc.). In some embodiments, one or more images may be received from the input module 201, the CT scanning device 103, an imaging device, a database or storage, and/or any other device that is capable of providing images. The images received by the image acquisition unit 301 may be sent to the registration unit 302, the segmentation unit 303, the noise and artifact reduction unit 304, and/or any other device for processing, transmission, and/or storage.

The registration unit 302 may be configured to perform image registration on image data. For example, image registration can be performed on multiple images to correct geometrical inconsistency between the images (e.g., by transforming different sets of image data into one coordinate system). The geometrical inconsistency may be caused by translation, rotation, scale transformation, the like, or a combination thereof. More particularly, for example, the geometrical inconsistency may include that the layout of the object being scanned is not perfectly parallel to the scanning surface of the imaging device. As a result, successive sub-images may be misaligned spatially. Other reasons may include, for example, the motion of a patient during the imaging procedure, the motion of an internal organ of the patient during the imaging procedure, the motion of the imaging device during the imaging procedure, elastic deformation of soft tissues, the like, or a combination thereof.

The image registration may be performed based on one or more algorithms such as recursion, a bisection method, an exhaustive method, a greedy algorithm, a divide and conquer algorithm, a dynamic programming method, an iterative method, a branch-and-bound algorithm, a backtracking algorithm, the like, or any combination thereof. In some embodiments, image registration may be performed using the Insight Segmentation and Registration Toolkit (ITK) provided by the U.S. National Library of Medicine of the National Institutes of Health.

In some embodiments, images (e.g., CT images) may be registered to generate prior images and/or to implement other functions in accordance with the present disclosure. For example, image registration may be performed on a first CT image and a second CT image to make pixels of the first CT image match with pixels of the second CT image. In some embodiments, the first CT image and the second CT image may be generated by different imaging devices (e.g., different CT scanning systems). The first CT image and the second CT image can represent image data of an object (e.g., a patient, an organ, etc.) with respect to various depths, viewpoints, coordinate systems, etc. In some embodiments, the first CT image and the second CT image may contain different amounts of metal artifacts. For example, the first CT image may contain more metal artifacts than the second CT image. The first CT image and the second CT image may be obtained at different times in some embodiments. In a more particular example, the first CT image may be a KVCT image. The second CT image may be a MVCT image (e.g., a MVCBCT image).

The segmentation unit 303 may be configured to perform image segmentation on image data. The image data may be provided by the image acquisition unit 301, the input module 201, the CT scanning device 103, a storage device (e.g., a floppy disk, a hard disk, a wireless terminal, a cloud-based storage device, etc.), and/or any other device that is capable of providing image data. The segmentation unit 303 can perform image segmentation by thresholding an image, performing edge detection, implementing edge-based segmentation techniques, implementing region-based segmentation techniques, feature extraction, etc. In some embodiments, image segmentation may be performed on an image (e.g., a CT image) to generate a noise image that representative of noises in the image. The noise image may include one or more portions of the image including metal artifacts.

The noise and artifact reduction unit 304 may be configured to reduce noise and/or artifact in images. One or more of the images may be provided by the image acquisition unit 301, the registration unit 302, the segmentation unit 303, the input module 201, the CT scanning device 103, and/or any other device that is capable of providing images. The noise and artifact reduction unit 304 may perform noise and/or artifact reduction on images based on any suitable technique and/or combinations of techniques, such as Chroma and luminance noise separation, anisotropic diffusion, wavelet transforms, a non-local means, a nonlinear filter, a statistical algorithm, a linear smoothing filter, the like, or any combination thereof.

In some embodiments, the noise and artifact reduction unit 304 may perform noise and/or artifact reduction on an image using a normalized metal artifact reduction (NMAR) algorithm. For example, a metal image may be obtained based on the image (e.g., by segmenting the image). A prior image can then be generated by segmentation of tissue and bone. Sinogram data of the prior image may be generated (e.g., by applying forward projection to the prior image). The original sinogram can be normalized to generate normalized projections. An interpolation-based MAR operation can then be applied to the normalized projections. Corrected sinogram data can be obtained by denormalization of the interpolated, normalized sinogram. In some embodiments, metal segmentation may be inserted back into the corrected image after reconstruction.

It should be understood that the preceding description of the image preprocessing module 202 is merely provided for the purposes of illustration, and not intended to limit the scope of the present disclosure. For persons having ordinary skills in the art, various variations and modifications may be made in the light of the present disclosure. For example, the noise and artifact reduction unit 304 may be an external component of the image preprocessing module 202. However, those variations and modifications do not depart from the protecting scope of the present disclosure.

Figure 4:
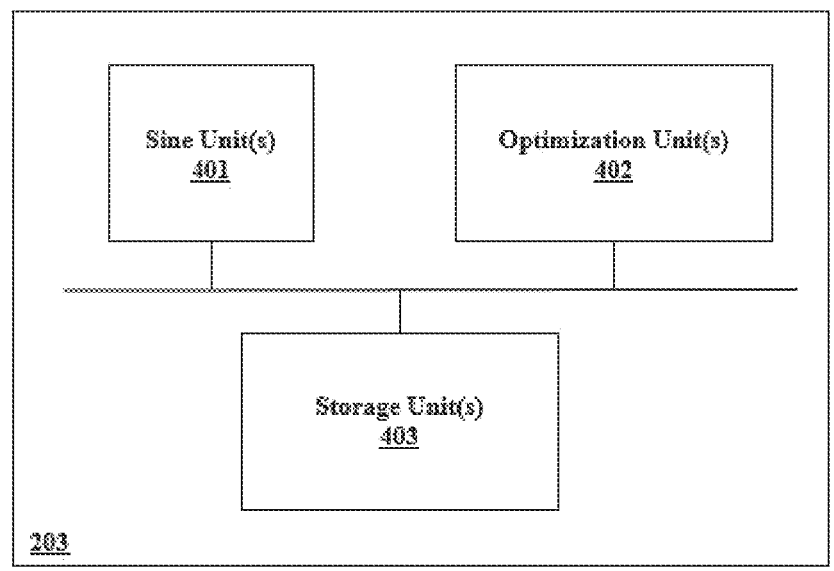
FIG. 4 is a block diagram illustrating an example of an image optimization module according to some embodiments of the present disclosure.

FIG. 4 is a block diagram of an image optimization module 203 according to some embodiments of the present disclosure. As shown, image optimization module may include one or more sine unit(s) 401, optimization unit(s) 402, and/or storage unit(s) 403. More or less components may be included in image optimization module 203 without loss of generality. For example, two or more of the units may be combined into a single units, or one of the units may be divided into two or more units. In one implementation, one or more of the units may reside on different computing devices (e.g., desktops, laptops, mobile phones, tablet computers, wearable computing devices, etc.).

The sine unit 401 may generate sinogram data of images. One or more of the images can be received from the image acquisition unit 301, the registration unit 302, the segmentation unit 303, the noise and artifact reduction unit 304, the input module 201, the CT scanning device 103, and/or any other device that is capable of providing images. For example, the sine unit 401 can generate one or more sinograms for one or more CT images (e.g., KVCT images, MVCT images, MVCBCT images, etc.), images generated based on the CT images (e.g., noise images, metal images, prior images, etc.), and/or any other image.

The optimization unit 402 may be configured to optimize sinogram data, such as sinogram data provided by the storage unit 403 or any other device that can generate and/or provide sinogram data. For example, the optimization unit 402 can construct one or more optimization models and can optimize sinogram data and/or image data based on the optimization model(s). In some embodiments, the optimized sinogram data (also referred to as the "corrected sinogram data") may be used to generate one or more corrected images. For example, a corrected image may be generated by reducing noise based on the optimization model.

The optimization model(s) may indicate a noise distribution of an image, noise amplitudes at respective points of the image, the like, or a combination thereof. The noise of an image may vary with the directions. For example, the noise along the z direction is different from the noise on the x-y plane. The optimization model(s) can be constructed based on the split Bregman algorithm, the Fourier slice theorem, the filtered back projection algorithm, fan-beam reconstruction, iterative reconstruction, the like, or any combination thereof. In some embodiments, an optimization model may be constructed by performing one or more operations described in connection with equations (1)-(15) below.

In some embodiments, the corrected sinogram data and/or the reconstructed image(s) may be generated by executing one or more iterations of optimization based on the optimization model. In some embodiments, corrected sinogram data and/or a corrected image may be generated during each of the iterations. For example, as will be discussed below in more detail referring to equations (1)-(15), one or more parameters related to the optimization model may be initialized based on experimental data, one or more user inputs, and/or any other information. Corrected sinogram data and/or reconstructed images may then be iteratively generated based on the initialized parameters and the optimization model until a condition is satisfied (e.g., execution of a certain number of iterations, satisfaction of a convergence condition, etc.).

In some embodiments, the optimization unit(s) 402 can construct an optimization model based on sinogram data generated by the sine unit(s) 401, such as sinogram data about one or more original KVCT images, sinogram data about one or more MVCT images (e.g., MVBCT images), etc. For example, $X_M$, $X_K \in R^{M \times N}$ may denote sinogram data of a MVCT image and an original KVCT image, respectively. $X \in R^{M \times N}$ may denote sinogram data of a reconstructed KVCT image generated based on the original KVCT image (e.g., an image with reduced artifacts). The optimization unit(s) 402 can construct an optimization model for reducing metal artifacts in the original KVCT image as the following optimization problem:

$$\mathrm{argmin}_X \|\nabla X - \nabla X_M\|_1 + \frac{\mu}{2} \|X - X_K\|_2^2, \quad (1)$$

where $$\nabla = \left[\frac{\partial}{\partial x}, \frac{\partial}{\partial y}\right]$$

is a gradient operator. The first term of equation (1) may represent the sparsity of a difference between gradients of the sinogram of the reconstructed KVCT image and the MVCBCT image. The second term of equation (1) indicates a difference between the sinogram of the reconstructed KVCT images and the sinogram of the original KVCT image. Let $U = X - X_M$ and $f = X_K - X_M$, equation (1) can be turned into the following optimization model:

$$\mathrm{argmin}_U \|\nabla_x U\|_1 + \|\nabla_y U\|_1 + \frac{\mu}{2} \|U - f\|_2^2. \quad (2)$$

In some embodiments, the optimization problem expressed in equation (2) can be solved based on a split Bregman optimization algorithm. For example, the optimization unit(s) 402 can replace $\nabla_x U$ and $\nabla_y U$ with $d_x$ and $d_y$, respectively. The optimization unit(s) 402 can then convert the optimization problem expressed in equation (2) into the following constrained optimization problem:

$$\mathrm{argmin}_U \|d_x\|_1 + \|d_y\|_1 + \frac{\mu}{2} \|U - f\|_2^2, \quad (3)$$
$$\text{s.t. } d_x = \nabla_x U, \; d_y = \nabla_y U.$$

In some embodiments, constrained items may be replaced with minimization items. Then, equation (3) can be transformed into the following non-constrained problem:

$$\mathrm{argmin}_{U, d_x, d_y} \|d_x\|_1 + \|d_y\|_1 + \quad (4)$$
$$\frac{\mu}{2} \|U - f\|_2^2 + \frac{\lambda}{2} \|d_x - \nabla_x U\|_2^2 + \frac{\lambda}{2} \|d_y - \nabla_y U\|_2^2,$$

where $\lambda$ is an introduced parameter.

The constraints may be strictly enforced (e.g., by applying the split Bregman algorithm) to get:

$$(U^{k+1}, d_x^{k+1}, d_y^{k+1}) = \mathrm{argmin}_{U,d_x,d_y} \|d_x\|_1 + \|d_y\|_1 + \quad (5)$$
$$\frac{\mu}{2}\|U-f\|_2^2 + \frac{\lambda}{2}\|d_x - \nabla_x U - b_x^k\|_2^2 + \frac{\lambda}{2}\|d_y - \nabla_y U - b_y^k\|_2^2.$$

In some embodiments, the values of $b_x^k$ and $b_y^k$ may be determined using the Bregman iterative algorithm based on the following equations:

$$b_x^{k+1} = b_x^k + (\nabla_x U^{k+1} - d_x^{k+1}) = \Sigma_{i=1}^{k+1}(\nabla_x U^i - d_x^i); \quad (6)$$

$$b_y^{k+1} = b_y^k + (\nabla_y U^{k+1} - d_y^{k+1}) = \Sigma_{i=1}^{k+1}(\nabla_y U^i - d_y^i); \quad (7)$$

During initialization, initial values of $b_x^0$ and $b_y^0$ may be set to 0.

In some embodiments, to optimize equation (5), its first variational derivative with respect to U may be set to zero:

$$0 = \mu(U^{k+1} - f) - \lambda \nabla_x^T(d_x^k - \nabla_x U^{k+1} - b_x^k) - \lambda \nabla_y^T(d_y^k - \nabla_y U^{k+1} - b_y^k). \quad (8)$$

Then, the equation about $U^{k+1}$ may be obtained as follows:

$$(\mu I + \lambda \nabla)U^{k+1} = \mu f + \lambda \nabla_x^T(d_x^k - b_x^k) + \lambda \nabla_y^T(d_y^k - b_y^k) \quad (9)$$

In some embodiments, the value of $U^{k+1}$ can be determined using Jacobin iteration method.

The function $|d_x|$ is differentiable in the domain $R\setminus\{0\}$. To minimize equation (5) with respect to $d_x$, its first variational derivative may be set to zero as follows:

$$0 = \begin{cases} 1 + \lambda d_x^k - \lambda \nabla_x U^{k+1} - \lambda b_x^k & d_x^k > 0 \\ 0 & d_x^k = 0 \\ 1 + \lambda d_x^k - \lambda \nabla_x U^{k+1} - \lambda b_x^k & d_x^k < 0 \end{cases} \quad (10)$$

The following equation may be derived and used to construct the optimization model:

$$d_x^k = \begin{cases} (\nabla_x U^{k+1} + b_x^k) - \frac{1}{\lambda} & (\nabla_x U^{k+1} + b_x^k) \in \left(\frac{1}{\lambda}, \infty\right) \\ 0 & (\nabla_x U^{k+1} + b_x^k) \in \left[\frac{-1}{\lambda}, \frac{1}{\lambda}\right] \\ \frac{1}{\lambda} + \nabla_x U^{k+1} + b_x^k & (\nabla_x U^{k+1} + b_x^k) \in \left(-\infty, \frac{-1}{\lambda}\right] \end{cases} \quad (11)$$

$$\Rightarrow d_x^k = \mathrm{shrink}\left(\nabla_x U^{k+1} + b_x^k, \frac{1}{\lambda}\right), \quad (12)$$

where $$\mathrm{shrink}(y, a) = \begin{cases} y + a & y \in (-\infty, -a) \\ 0 & y \in [-a, a] \\ y - a & y \in (a, \infty) \end{cases} \quad (13)$$

Similarly, the following equation may be obtained to construct the optimization model:

$$d_y^k = \mathrm{shrink}\left(\nabla_y U^{k+1} + b_y^k, \frac{1}{\lambda}\right) \quad (14)$$

In some embodiments, the optimization unit(s) 402 may set one or more parameters to construct the optimization model. For example, the parameter p may be set to specify the fidelity weight. In some embodiments, the parameter p may be set to a positive value.

As another example, the parameter p may be set to achieve a stronger denoising. The proposed algorithm in the present disclosure may also be regarded as an image inpainting algorithm. In some embodiments, different values of parameter p may be used for different regions of an image, such as one or more metal projection regions that correspond to portions of the image that contains metal artifacts and/or that are to be corrected. In some embodiments, different values of parameter p may be used to perform noise and/or artifact reduction for metal projection regions of different sizes. In some embodiments, the value of p may be set to zero in a metal projection region of the image to be corrected. The value in other region of sinogram of KVCT needs to be preserved. Thus, µ may be set to a large value. In some embodiments, the value of µ may be set to $1 \times 10^2$.

As still another example, parameter λ may be set in the optimization process. In some embodiments, the value of λ may be derived based on experimental data, user inputs, etc. In some embodiments, the value of λ may be set to $5 \times 10^{-2}$.

In some embodiments, the value of parameter U may be initialized to satisfy U=f. The optimization model may be constructed by executing one or more iterations described above. The iterations may be executed to construct the optimization model until a condition is satisfied. For example, a certain number of iterations may be executed. The maximum number of iterations may be set to any suitable number (e.g., 99, 100, 101, or any other number). In some embodiments, the maximum number of iterations may be determined based on experimental data, user inputs, and/or any other information. As another example, the iterations may be executed until a convergence condition is satisfied. In some embodiments, the convergence condition may be and/or include:

$$\frac{\|U^{k+1} - U^k\|_2}{\|U^k\|_2} < 1 \times 10^{-4}. \quad (15)$$

The storage unit(s) 403 may be configured to receive and store data provided by the sine unit 401, the optimization unit 402, and/or any other device. The data may include sinogram data (e.g., one or more sinograms, corrected sinograms, etc.), image data, data about one or more optimization models (e.g., algorithms to generate the optimization model(s), one or parameters, etc.), and/or any other data that can be used to perform image reconstruction. The data stored in the storage unit(s) 403 may be sent to the sine unit 401, the optimization unit 402, the output module 204, and/or any other unit.

It should be understood that the preceding description of the image optimization module is merely provided for the purposes of illustration, and not intended to limit the scope of the present disclosure. For persons having ordinary skills in the art, various variations and modifications may be made in the light of the present disclosure. However, those variations and modifications do not depart from the protecting scope of the present disclosure.

Figure 5:
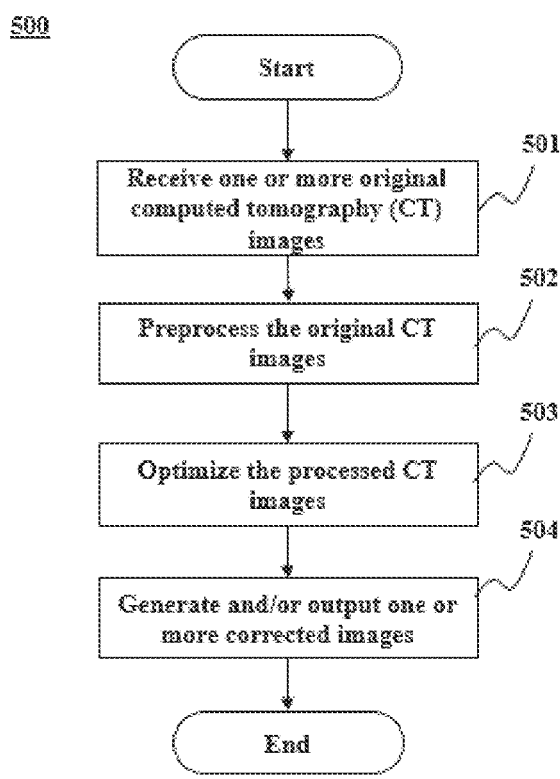
FIG. 5 is a flowchart illustrating an example of a process for noise reduction in CT images according to some embodiments of the present disclosure.

FIG. 5 is a flowchart illustrating an example 500 of a process of noise reduction in CT images according to some embodiments of the present disclosure. Process 500 may be performed by processing logic that comprises hardware (e.g., circuitry, dedicated logic, programmable logic, microcode, etc.), software (e.g., instructions run on a processing device to perform hardware simulation), or a combination thereof. In some implementations, process 500 may be performed by one or more processing devices (e.g., image processing device 101 as described in connection with FIGS. 1-4 above).

In step 501, one or more original computed tomography (CT) images may be received. The original CT images may be images of an object. The object may include a body, a tissue, an organ, a specimen, a substance, or the like, or any combination thereof. In some embodiments, the object may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. The original images may include composite images, sub-images of the region of interest through a series of scans, overlapping images of the sub-images, or the like, or a combination thereof.

The original CT mages may be generated by any suitable imaging device, such as one or more CT scanning devices (e.g., CT scanning device 103 of FIG. 1). In some embodiments, the original images may include one or more KVCT images, MVCT images (e.g., MVCBCT images), and/or any other CT image. In some embodiments, the original images may be captured by different sensors and/or imaging devices, from different viewpoints, at different times, etc. The original images may contain different amounts of metal artifacts. For example, a KVCT image may contain more metal artifacts than a MVCT image.

In step 502, the original images may be preprocessed. For example, one or more of the original images may be preprocessed by performing registration of images (e.g., KVCT images and MVCT images), generating noise images of the original images (e.g., segmenting metal images from KVCT images), reducing metal artifacts of the original images, the like, or a combination thereof. In some embodiments, the original images may be preprocessed by performing one or more operations described in connection with FIG. 6 below.

In step 503, one or more of the preprocessed images may be optimized. For example, sinogram data of one or more of the preprocessed images may be obtained. One or more optimization models may be constructed to facilitate image reconstruction. One or more corrected images (also referred to as "reconstructed images") may then be generated based on the optimization model(s) and/or the sinogram data. In some embodiments, the noise and/or artifact reduction may be performed by performing one or more operations described in connection with FIG. 7 below.

In step 504, the corrected image(s) and/or any other data may be outputted. For example, the corrected image(s) and/or data may be outputted to a device for further processing, presentation, storage, transmission, etc.

Figure 6:
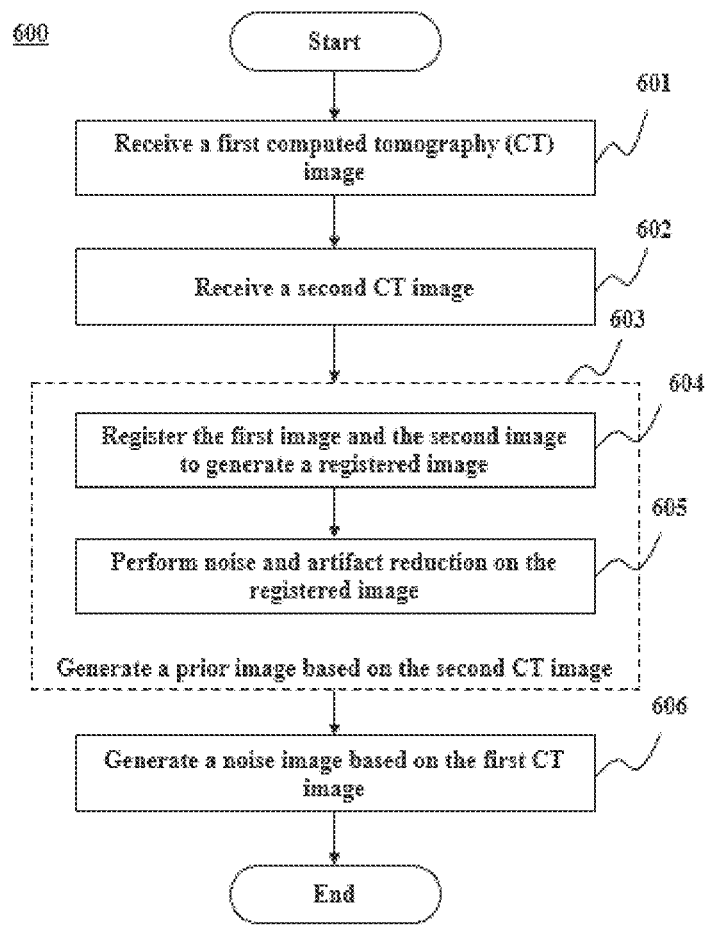
FIG. 6 is a flowchart illustrating an example of a process of image preprocessing according to some embodiments of the present disclosure.

FIG. 6 is a flowchart illustrating an example 600 of a process of image preprocessing according to some embodiments of the present disclosure. Process 600 may be performed by processing logic that comprises hardware (e.g., circuitry, dedicated logic, programmable logic, microcode, etc.), software (e.g., instructions run on a processing device to perform hardware simulation), or a combination thereof. In some implementations, process 600 may be performed by one or more processing devices (e.g., image processing device 101 of FIG. 1) executing the image preprocessing module(s) 202 as described in connection with FIGS. 2-3 above.

In step 601, a first CT image may be received. In step 602, a second CT image may be received. The CT first image and/or the CT second image can be received from one or more scan systems (e.g., system 100 of FIG. 1), storage devices, and/or any other device that can provide CT images. The first CT image and the second CT image can be received in parallel, sequentially, or in any other suitable manner. The first CT image and the second CT image may or may not relate to the same object. For example, the first CT image and the second CT image may include data about the same object (e.g., a patient, an organ, etc.). The first CT image and the second CT image can represent various aspects of the object (e.g., image data captured at different times, different positions of the patient, etc.). The first CT image and the second CT images may be generated using various CT scanning techniques. For example, the first CT image may be a KVCT image. The second CT image may be a MVCT image.

In step 603, process 600 can generate a prior image based on the second CT image. For example, process 600 may perform image registration on the first CT image and the second CT image. As another example, process 600 can perform MAR on the second CT image. In a more particular example, the prior image may be generated by performing steps 604 and/or 605.

In step 604, image registration may be performed to make pixels of the first CT image match with pixels of the second CT image. The image registration may be performed by the registration unit(s) 302 of FIG. 3. In some embodiments, various algorithms for image registration may be implemented iteratively until pixels of the second CT image align with pixels of the first CT image.

In step 605, noise and artifact reduction can be performed on the prior image. For example, metal artifacts in the prior image may be reduced using any suitable metal artifact reduction (MAR) technique and/or combination of techniques. More particularly, for example, the metal artifacts may be reduced using the normalized metal artifact reduction (NMAR). In some embodiments, the noise and artifact reduction can be performed by the noise and artifact reduction unit(s) 304 as described in connection with FIG. 3 above.

In step 606, process 600 can generate a noise image based on the first CT image. For example, the noise image may be generated by thresholding the first CT image. The noise image may represent one or more portions of the first CT image that includes metal artifacts and/or any other type of noise and/or artifact.

Figure 7:
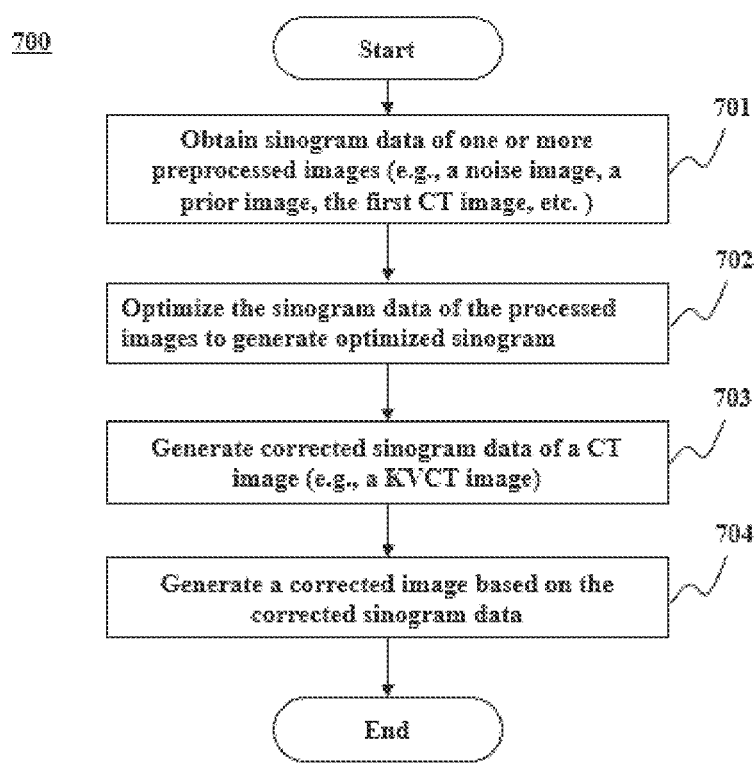
FIG. 7 is a flowchart illustrating an example of a process of image optimization according to some embodiments of the present disclosure.

FIG. 7 is a flowchart illustrating an example 700 of a process of image optimization according to some embodiments of the present disclosure. Process 700 may be performed by processing logic that comprises hardware (e.g., circuitry, dedicated logic, programmable logic, microcode, etc.), software (e.g., instructions run on a processing device to perform hardware simulation), or a combination thereof. In some implementations, process 700 may be performed by one or more processing devices (e.g., image processing device 101 of FIG. 1) executing the image optimization module(s) 203 as described in connection with FIGS. 2 and 4 above.

In step 701, process 700 can obtain sinogram data of one or more preprocessed images. The preprocessed images may include one or more images generated by process 600 (e.g., one or more noise images, prior images, the first CT image, the second CT image, etc.), and/or any other image. For example, sinograms may be obtained for the first CT image, the noise image, and the prior image, respectively. In some embodiments, the sinogram data of the preprocessed image(s) may be generated using the forward projection method. For example, a radon transform may be performed on an image to generate a sinogram for the image.

In step 702, process 700 can optimize the sinogram data. The optimization may be performed based on one or more optimization models. For example, an optimization models parse via $L_1$ sparse regularization in gradient domain may be constructed. The optimization model may be used to interpolating mental projection based on the sinogram of the prior image and the first image. In some embodiments, the optimization model may be constructed based on equations (1)-(15). In some embodiments, the optimization may be performed iteratively using different algorithms until a desired result is obtained (e.g., satisfaction of a convergence condition, execution of a certain number of iterations, etc.).

In step 703, process 700 can generate corrected sinogram data of a CT image based on the optimization. In some embodiments, the CT image may be the first image as described in FIG. 6. The corrected sinogram may be obtained based on the optimization model. For example, the corrected sinogram may be obtained by solving one or more optimization problems defined by the optimization model. The corrected sinogram may be transferred and stored in any suitable storage device.

In step 704, a corrected image may be generated based on the corrected sinogram data. In some embodiments, the corrected image may be generated using the backward projection method. For example, the corrected image may be generated by applying a ramp filter and then back projecting. The back projection can be an accumulation of values in the pixels of the corrected image. In some embodiments, the back projection can be implemented by performing a dual Radon transform (e.g., an adjoint to the Radon transform). Steps 701 and 704 may be inverse processes in some embodiments.

Figure 8A:
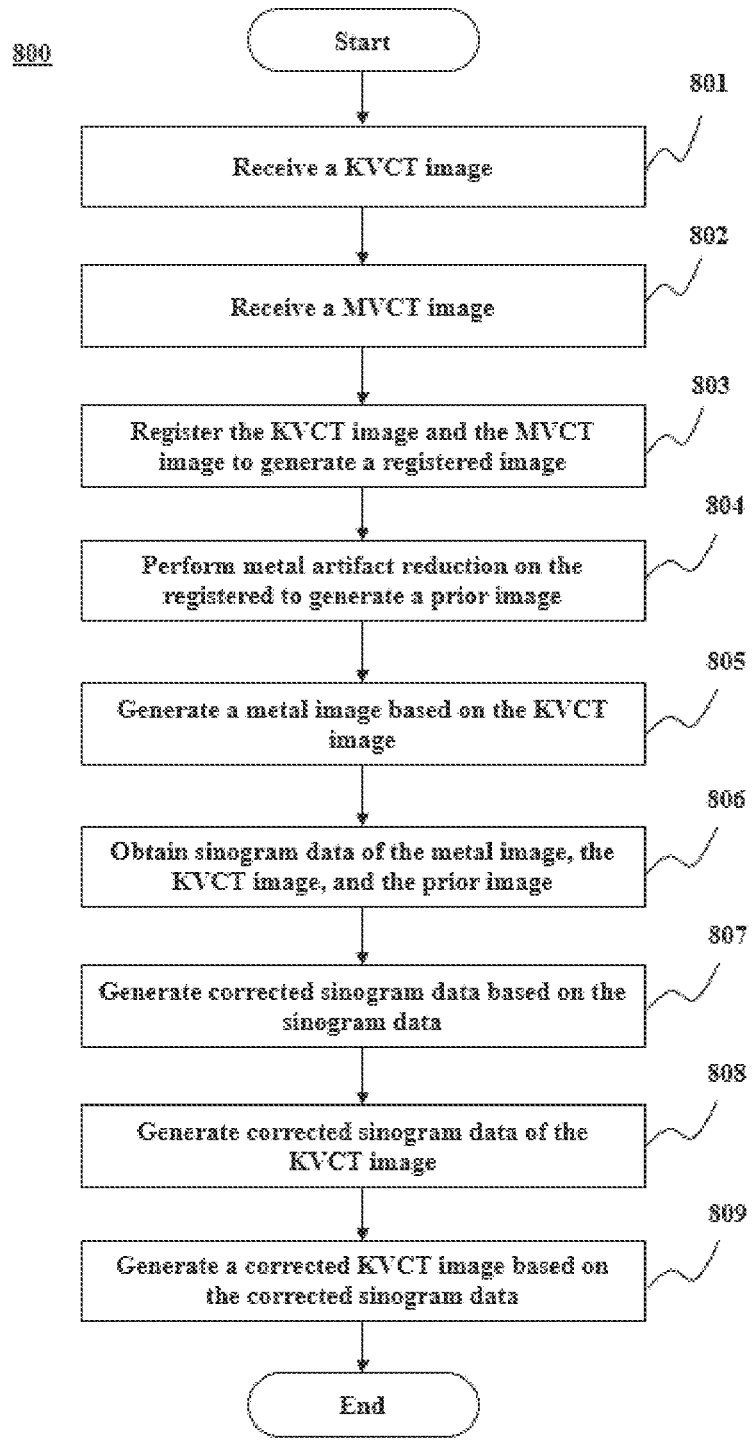
FIGS. 8A and 8B are flowcharts illustrating a process of metal artifact reduction (MAR) in KVCT images according to some embodiments of the present disclosure.
Figure 8B:
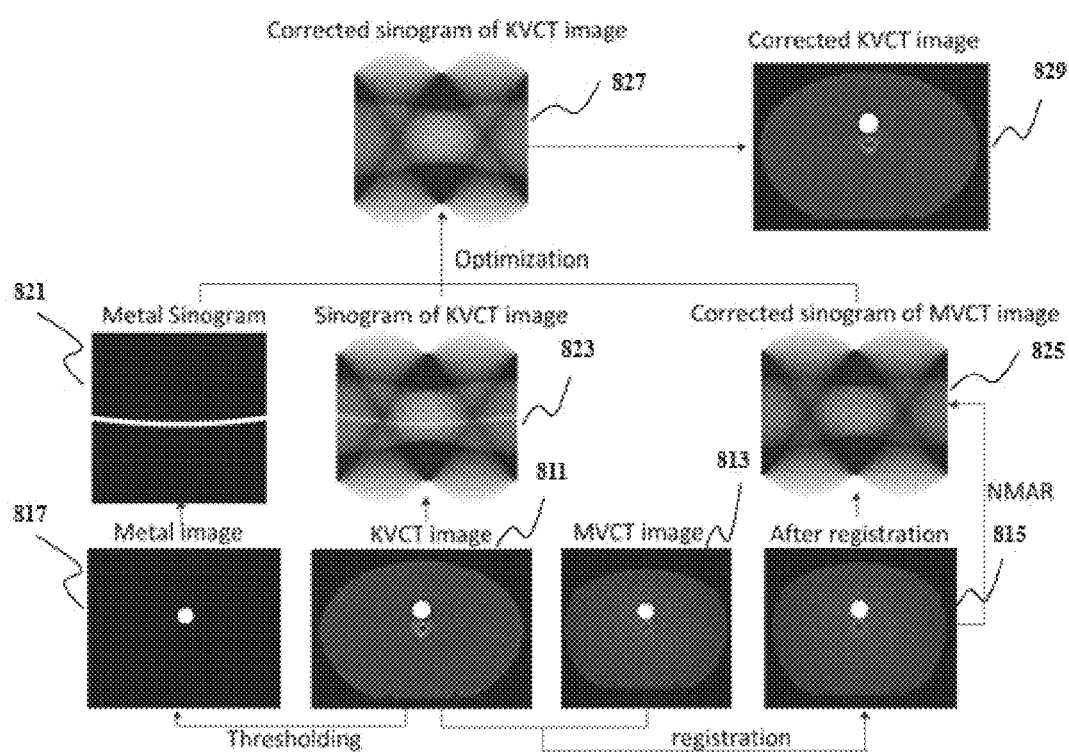

FIGS. 8A and 8B are flowcharts illustrating an example 800 of a process of metal artifact reduction in CT images according to some embodiments of the present disclosure. Process 800 may be performed by processing logic that comprises hardware (e.g., circuitry, dedicated logic, programmable logic, microcode, etc.), software (e.g., instructions run on a processing device to perform hardware simulation), or a combination thereof. In some implementations, process 800 may be performed by one or more processing devices (e.g., image processing device 101 of FIG. 1) as described in connection with FIGS. 1-4 above.

As shown in the FIG. 8A, one or more KVCT images and MVCT images may be received in steps 801 and 802. In some embodiments, the KVCT images and the MVCT images may be obtained at different times, from different viewpoints, and/or by different imaging device and/or sensors. The KVCT images and the MVCT images may correspond to different positions of an object (e.g., a patient, an organ of the patient, etc.). In a more particular example, a KVCT image 811 and a MVCT image 813 as illustrated in FIG. 8B can be received at steps 801 and 802.

In step 803, process 800 can register the KVCT image and the MVCT image. For example, the MVCT image may be registered to align with the KVCT image using any suitable image registration technique. In some embodiments, the registration may be performed by the registration unit(s) 301 of FIG. 3. As illustrated in FIG. 8B, a registered image 815 may be generated in some embodiments.

In step 804, process 800 can perform metal artifact reduction on the registered to generate a prior image. The metal artifact reduction can be performed using any suitable technique and/or combination of techniques. For example, the metal artifact reduction can be performed based on the NMAR algorithm.

In step 805, process 800 can generate a metal image based on the KVCT image. The metal image may correspond to one or more portions of the KVCT image that contain metal artifacts. In some embodiments, the metal image may be generated by applying one or more image segmentation techniques to the KVCT image. For example, the metal image may be generated by thresholding the KVCT image. As illustrated in FIG. 8B, a metal image 817 may be generated based on the KVCT image 811.

In step 806, process 800 can obtain sinogram data of the metal image, the KVCT image, and/or the prior image. For example, as illustrated in FIG. 8B, sinograms 821, 823, and 825 may be generated for the metal image, the KVCT image, and the prior image, respectively. In some embodiments, multiple sinograms may be generated in parallel, sequentially, or in any other manner.

In step 807, process 800 can generate corrected sinogram data based on the sinogram data. In some embodiments, the corrected sinogram data can be generated based on one or more optimization models, such as an optimization model constructed by the optimization unit(s) 402 of FIG. 4. As an example, a corrected sinogram of the KVCT image 827 shown in FIG. 5B can be generated based on such an optimization model. The corrected sinogram may be generated based on one or more of sinograms 821, 823, and 825, and/or any other data.

In step 808, process 800 can generate a corrected KVCT image based on the corrected sinogram data. For example, as illustrated in FIG. 8B, a corrected KVCT image 829 can be generated based on the corrected sinogram 827.

It should be noted that the above steps of the flow diagrams of FIGS. 5-8A can be executed or performed in any order or sequence not limited to the order and sequence shown and described in the figures. Also, some of the above steps of the flow diagrams of FIGS. 5-8A can be executed or performed substantially simultaneously where appropriate or in parallel to reduce latency and processing times. Furthermore, it should be noted that FIGS. 5-8A are provided as examples only. At least some of the steps shown in these figures can be performed in a different order than represented, performed concurrently, or altogether omitted.

Figure 9A:
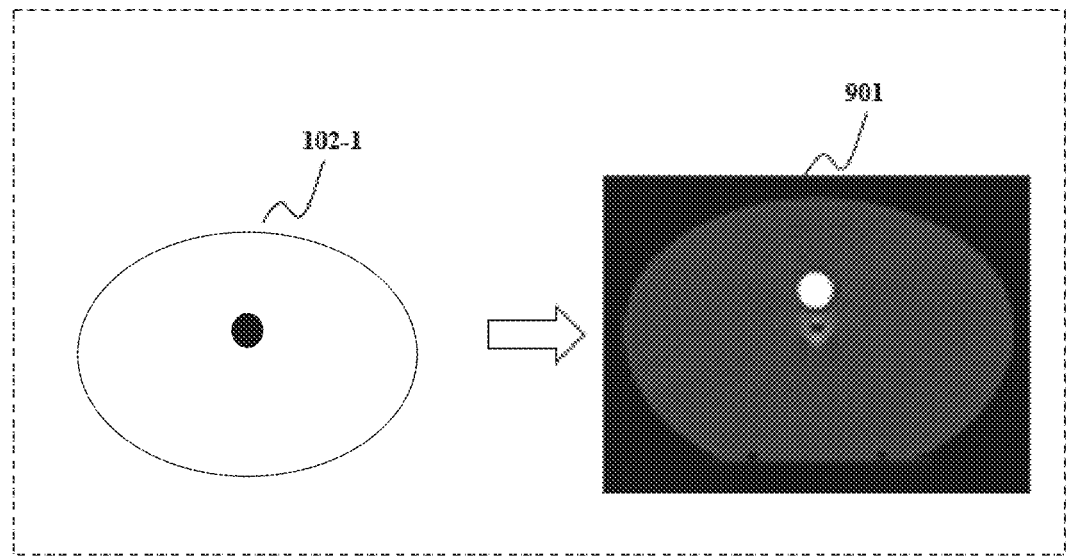
FIGS. 9A and 9B are examples of corrected images according to some embodiments of the present disclosure.
Figure 9B:
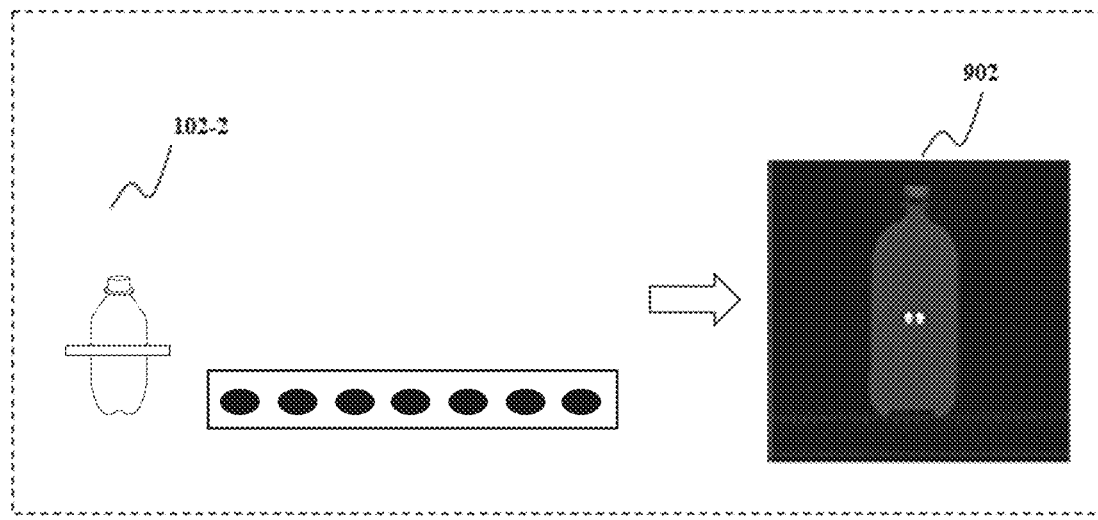

FIGS. 9A and 9B illustrate examples of corrected CT images with reduced metal artifacts according to some embodiments of the present disclosure. As illustrated in FIG. 9A, phantom 102-1 may contain a single steel insert. A solid steel rod (2.5 cm diameter and 7.8 g/cm$^3$) is used to simulate metal implant. Phantom 102-2 may contain bilateral steel inserts. The metal implant is stainless steel with seven ellipse holes. A SOMATOM Definition Flash CT scanning produced by the German Siemens Company is used to develop the KVCT images. The scan voltage is 120 KV and the active current is automatically generated by CT. The scanning mode is axis scan. A German Siemens Artiste accelerator megavoltage cone beam CT (MV-CBCT) scanning is used to develop the MVCT images. The image acquisition dose is 8 MU, and the scan angle is 360 degrees. FIG. 9A illustrates the corrected KVCT image 901 with some algorithms of the present disclosure for phantom 102-1. FIG. 9B illustrates the corrected KVCT image 902 with some algorithms of the present disclosure for phantom 102-2.

As will be also appreciated, the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Computer program code for carrying out operations for aspects of the present disclosure may be written in any combination of one or more programming languages, including an object oriented programming language such as Java, C++, C #, VB, Scala, Smalltalk, Eiffel, JADE, Emerald, NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "generating," "providing," "calculating," "executing," "storing," "producing," "determining," "reducing," "registering," "reconstructing," "segmenting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, any suitable media that is fleeting and devoid of any semblance of permanence during transmission, and/or any suitable intangible media.

Accordingly, methods, systems, and media for image reconstruction are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter.

What is claimed is:

1. A method for reducing metal artifacts in a kilovoltage computed tomography (KVCT) image, comprising:
    receiving a first computed tomography (CT) image and a second CT image wherein the first CT image is a KVCT image, and wherein the second CT image is a megavoltage computed tomography (MVCT) image;
    generating, by a processing device, a prior image based on the second CT image by:
        registering the first CT image and the second CT image to generate a registered image; and
        reducing noise artifacts in the registered image to generate the prior image;

generating a noise image based on the first CT image, wherein the noise image corresponds to metal artifacts in the first CT image; and reconstructing, by the processing device, the first CT image based at least in part on the prior image and the noise image.

2. The method of claim 1, wherein registering the first CT image and the second CT image comprises making pixels of the first CT image match with pixels of the second CT image.

3. The method of claim 1, wherein reducing the noise artifacts in the registered image comprises performing a normalized metal artifact reduction (NMAR) algorithm.

4. The method of claim 1, wherein generating the noise image comprises performing image segmentation on the first CT image.

5. The method of claim 1, wherein the noise image is a metal image.

6. The method of claim 1, wherein reconstructing the first CT image comprises:
   generating a first sinogram of the prior image, a second sinogram of the noise image, and a third sinogram of the first CT image;
   generating a corrected sinogram of the first CT image based at least in part on the first sinogram, the second sinogram, and the third sinogram; and
   reconstructing the first CT image based on the corrected sinogram.

7. The method of claim 6, wherein generating the second sinogram and the third sinogram comprises performing forward projection.

8. The method of claim 6, further comprising: constructing an optimization model based on the first sinogram, wherein the corrected sinogram of the first CT image is generated based on the optimization model, and the optimization model comprises a variational model via $L_1$ sparse regularization in a gradient domain.

9. The method of claim 6, wherein reconstructing the first CT image comprises performing backward projection on the corrected sinogram.

10. A system for reducing metal artifacts in a kilovoltage computed tomography (KVCT) image, comprising:
   at least one processor to:
      receive a first computed tomography (CT) image and a second CT image wherein the first CT image is a KVCT image, and wherein the second CT image is a megavoltage computed tomography (MVCT) image;
      generate a prior image based on the second CT image by:
         registering the first CT image and the second CT image to generate a registered image; and
         reducing noise artifacts in the registered image to generate the prior image;
      generate a noise image based on the first CT image, wherein the noise image corresponds to metal artifacts in the first CT image; and
      reconstruct the first CT image based at least in part on the prior image and the noise image.

11. The system of claim 10, wherein, to register the first CT image and the second CT image, the at least one processor is further to make pixels of the first CT image match with pixels of the second CT image.

12. The system of claim 10, wherein, to reduce the noise artifacts in the registered image, the at least one processor is further to perform a normalized metal artifact reduction (NMAR) algorithm.

13. The system of claim 10, wherein, to generate the noise image, the at least one processor is further to perform image segmentation on the first CT image.

14. The system of claim 10, wherein to reconstruct the first CT image, the at least one processor is further to:
   generate a first sinogram of the prior image, a second sinogram of the noise image, and a third sinogram of the first CT image;
   generate a corrected sinogram of the first CT image based at least in part on the first sinogram, the second sinogram, and the third sinogram; and
   reconstruct the first CT image based on the corrected sinogram.

15. The system of claim 14, wherein the at least one processor is further to:
   construct an optimization model based on the first sonogram, wherein the optimization model comprises a variational model via $L_1$ sparse regularization in a gradient domain; and
   generate the corrected sinogram of the first CT image based on the optimization model.

16. A non-transitory machine-readable storage medium including instructions that, when accessed by at least one processor, cause the at least one processor to:
   receive a first computed tomography (CT) image and a second CT image wherein the first CT image is a KVCT image, and wherein the second CT image is a megavoltage computed tomography (MVCT) image;
   generate a prior image based on the second CT image by:
      registering the first CT image and the second CT image to generate a registered image; and
      reducing noise artifacts in the registered image to generate the prior image;
   generate a noise image based on the first CT image, wherein the noise image corresponds to metal artifacts in the first CT image; and
   reconstruct the first CT image based at least in part on the prior image and the noise image.

* * * * *